United States Patent
Newman

[11] Patent Number: 5,500,695
[45] Date of Patent: Mar. 19, 1996

[54] TORIC LENS WITH ORIENTATION WAVE FORMS

[76] Inventor: Steve Newman, 7 Imray St., Sunnybank Hills, QLD 4109, Australia

[21] Appl. No.: 167,823
[22] PCT Filed: Jun. 16, 1992
[86] PCT No.: PCT/AU92/00290
§ 371 Date: Jan. 18, 1994
§ 102(e) Date: Jan. 18, 1994
[87] PCT Pub. No.: WO92/22845
PCT Pub. Date: Dec. 23, 1992

[30] Foreign Application Priority Data

Jun. 17, 1991 [AU] Australia .................... PK6713

[51] Int. Cl.[6] .................................................. G02C 7/04
[52] U.S. Cl. ................ 351/161; 351/160 R; 351/160 H
[58] Field of Search ............................ 351/160 R, 160 H, 351/161, 162

[56] References Cited

U.S. PATENT DOCUMENTS

| | | |
|---|---|---|
| 4,573,774 | 3/1986 | Sitterle .................................... 351/161 |
| 4,859,049 | 8/1989 | Muller ..................................... 351/161 |
| 5,009,497 | 4/1991 | Cohen ..................................... 351/161 |
| 5,016,977 | 5/1991 | Baude et al. ......................... 351/160 R |

FOREIGN PATENT DOCUMENTS

| | | |
|---|---|---|
| 42023 | 12/1981 | European Pat. Off. . |
| 62178 | 10/1982 | European Pat. Off. . |
| 0375291A2 | 6/1990 | European Pat. Off. . |
| 0382620A1 | 8/1990 | European Pat. Off. . |
| 0453140A2 | 10/1991 | European Pat. Off. . |
| WO88/09950 | 12/1988 | WIPO . |
| 89/07303 | 8/1989 | WIPO . |
| 89/07281 | 8/1989 | WIPO . |
| 93/03409 | 2/1993 | WIPO . |

Primary Examiner—Scott J. Sugarman
Attorney, Agent, or Firm—Fisher, Christen & Sabol

[57] ABSTRACT

An improved contact lens (1) having an optic zone (4) and a radial planar zone (5) such that the radial planar zone has an array of contours which are defined by a waveform or waveforms (2, 3) comprising crests and troughs on the back and/or front surface of the lens. The waveform(s) provide(s) means to enable proper location and orientation of the lens on the eye of a wearer by interaction between the lens, the eye and an eyelid and facilitating increased gas transmission through the lens.

22 Claims, 2 Drawing Sheets

11# TORIC LENS WITH ORIENTATION WAVE FORMS

FIELD OF THE INVENTION

The present invention relates to contact lenses and more particularly relates to an improvement in the known designs of contact lenses.

BACKGROUND OF THE INVENTION

There are a number of lens designs presently in existence which have design regimes which enable achievement of various effects relating to interplay between the cornea, the lens and the eye lids of a wearer, especially in assisting with lens orientation on the eye of a wearer.

In the past, lenses (which usually have a circular appearance from a plan view and a concave outward appearance from a side view) have had machining performed on them in various ways in an attempt to provide a lens configuration which will enable correct lens orientation on the eye as well as adequate control of the lens on the eye of the wearer. Traditionally, the correct lens orientation on the eye has been achieved by providing on the lens surface, machined prisms, wedges and truncations.

In implementation of these designs it is also necessary for the designer to consider the requirement of transmission of gas between the lens and the cornea. Low gas transmission may create problems on the eye of a wearer which stem from not allowing the eye to breathe.

A contact lens sits in apposition with the cornea or the sclera or both. It is important that a lens be able to transmit or allow a passage of oxygen to reach the eye so that natural conditions can be maintained as far as is practical near the eye and on the eye surface. Proper orientation of a lens on the eye is necessary for proper correction of astigmatism.

When a lens is oriented in the proper direction, the astigmatic error in the lens is closely coincidental with the astigmatic error in the eye. It is essential that this be achieved to prevent visual acuity deteriorating.

The prior art lenses achieve orientation by three main ways. The first relates to prism formation on the lens. This is achieved by machining of the lens surface to allow the eye lids to complement the lens surface configuration thereby assisting in proper location of the lens. In one configuration the lens is thickened towards the bottom.

The second method of lens orientation is achieved by zonal thinning. In this case, the top and bottom peripheral areas of the lens are thinned by machining. The eye lid pressure then moves the lens around to find the line of least resistance to thereby hold the lens in the correctly oriented position. The former method of lens orientation suffers from a number of disadvantages namely the aforesaid thickened portion of the lens may prevent adequate oxygen transmission through the lens. This can result in oedema or corneal neovascularisation. Another consequence of the lens thickening is wearer discomfort.

The zonal thinning method also has disadvantages. Namely, using this method it is difficult to make a lens to the required degree of accuracy and reproduceability. The degree of orientation accuracy is not always as good as required and zonal thinning does not work well for high positive corrections due to the thinness of the periphery of the lens. The third method of lens orientation which was provided for a lens was to have grooves and/or patterns forming grooves in the front or back surfaces of the lens. The grooves and/or patterns aid in the correct orientation of the lens on the eye and increase gas transmission through the lens.

Preferably in lenses designed in this way there are a series of grooves or patterns on the lens which are held by the upper eye lid thus aiding lens orientation. When these lenses are inserted on the eye, during the blink action, the spungy palpabral and/or tarsal burbar conjunctiva grips the indentation in the lens surface and orientates the lens by following the slope of the pattern or grooves.

The grooves and/or patterns formed on the lens facilitate proper orientation on the eye and without compromise to the relationship between the cornea, conjunctiva and lens thereby eliminating discomfort and eye irritation from the contact lens.

This known type of lens configuration has many advantages over the earlier designs, for instance, no increase in the lens thickness nor chamferings of the lens surface is necessary for lens orientation. These grooves or patterns can be applied to bifocal contact lenses to improve location of the lens for alternating vision.

Although the overall concept of utilising patterns and grooves is known, that concept has to date been in its early experimental stages such that it has hitherto previously been unclear as to exactly how the lens is oriented on the eye according to the particular force regime generated by a pre-selected groove or pattern configuration. The grooves and/or patterns can be formed on either the back or front surface of the lens according to requirements.

The patterns and/or grooves known in the prior art methodology provide a means for harnessing lid forces and various physiological forces pertaining specifically to the eye and its various movements and actions. To date, apart from experimentation with the pattern and groove concept, it has not previously been disclosed as to exactly how using those patterns and grooves the lens properly orientates on the eye of a wearer.

After considerable experimentation it has been found that there is an optimum lens surface relief design for enabling proper orientation on the eye. Furthermore, it can now be indicated exactly how the forces transmit on and about the optimum lens surface relief design to enable proper orientation on the eye of a wearer.

SUMMARY OF THE INVENTION

In its broadest form the present invention comprises;

an improved contact lens having an optic zone and a radial planar zone, the lens comprising; an array of contours which are defined by a waveform or waveforms comprising crests and troughs on the back and/or front surface of the lens, said waveform/s providing means to enable proper location and orientation of the lens on the eye of a wearer by interaction between said lens, said eye and an eyelid and facilitating increased gas transmission through said lens.

In the preferred embodiment tile waves are arranged so as to allow the eye lid of a wearer to follow the contours of the said waves to enable the proper orientation of the lens on the eye.

According to an alternative embodiment, the waves are substantially parallel to each other and are formed in series near the edge of the lens. Alternatively, the waves can be disposed in a radial array around the periphery of the lens or disposed randomly across either the front or back surface of a lens. The waves may be formed in any position on the back or front lens surfaces according to design requirements. The waveform pattern which achieves the improved results of the present invention in comparison to the prior art lens designs may be raised proud of the outer surface of the lens or alternatively they can be indented below the enter surface of the lens or alternatively, there can be a combination of contours above and below the back and/or front outer surfaces of the lens. This has the benefit of eliminating the binding of ridged lenses on the cornea during wear. Binding is a known phenomenon and results in fitting complications in prior art lens wear. It can lead to epithelial denuding of the cornea with consequent risk of infection or ulcerisation. It can also cause ocular problems such as anoxi and/or oedema during wear. The wave pattern also has an effect of eliminating this binding effect.

In the astigmatic lens design using waveforms, lid pressure is utilised to provide a series of differential forces to orientate the lens. This is achieved in broad terms by means of either a raised or lowered area at the peripheral, horizontal area of the lens. Thus, rather than a pre-astigmatic zone decreasing in thickness over a wide lens area, a wave formation has been found which can be utilised such that the average lens thickness is left similar or close to a non astigmatic lens of similar power. The waveform areas may be lathe cut or they may also be created by spin casting, laser sculpturing or moulding.

In the case of a bifocal lens, a specific wave or wave formation is created in the superior lens area by molding, spin casting or lathing or laser sculpturing utilising narrow but continuous waves for example in the form of a series of waves. Where a configuration is adopted on a series of wave formations, lid pressure forces the soft conjunctiva into the wave troughs. In this way both lens orientation is achieved and also lens movement on blinking. A bi-focal lens design can also be produced which allows for reading vision or inferior gaze in the same manner as a spectacle bi-focal. It is also envisaged that the waveform adopted in the present invention could be utilised with multi-focal design lenses.

BRIEF DESCRIPTION OF THE DRAWINGS

The present invention will now be described in more detail and with reference to the accompanying illustrations wherein.

DETAILED DESCRIPTION OF THE INVENTION

Figure 1:
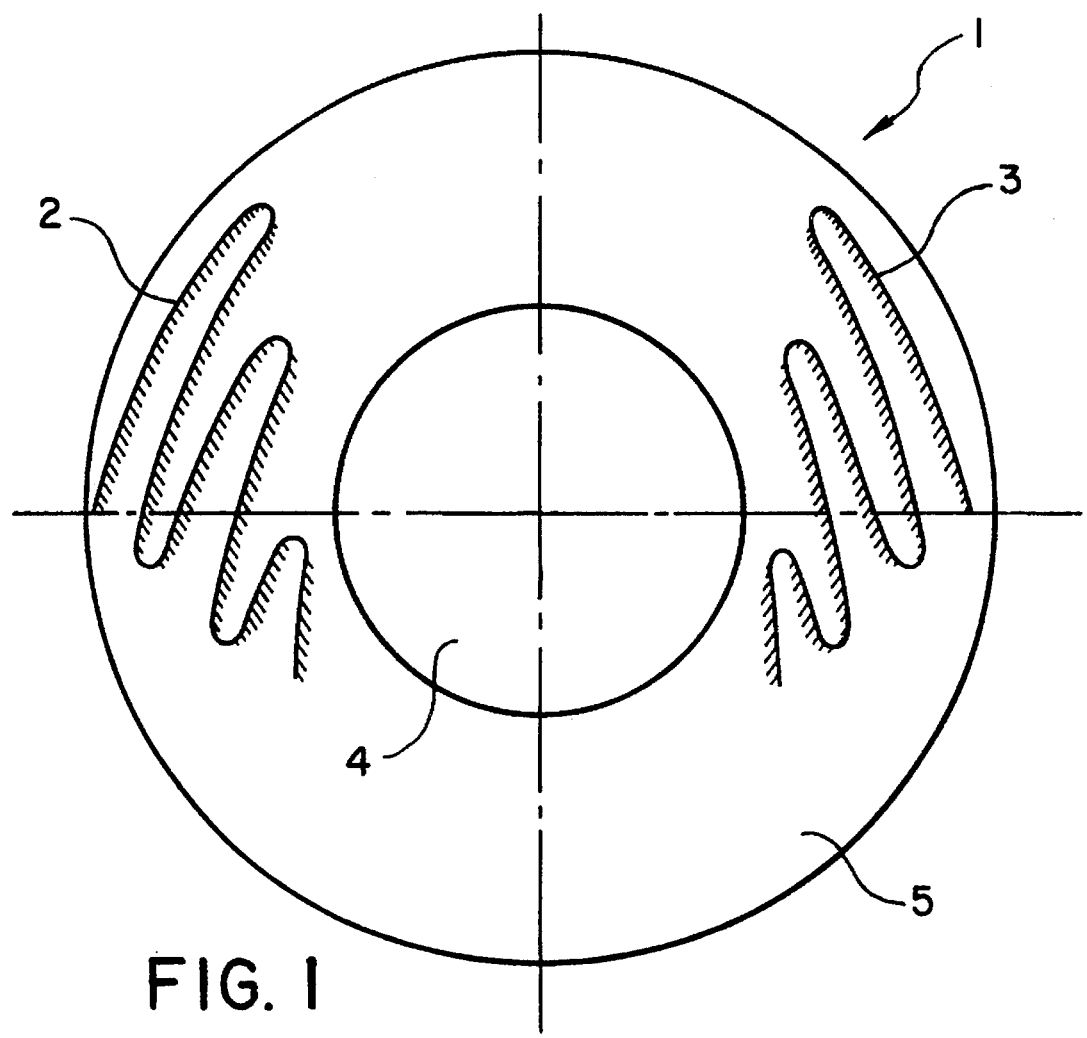
FIG. 1: shows a front elevation of a lens having waveforms thereon according to one embodiment of the invention.

Referring to FIG. 1 there is shown a front elevational view of a lens 1 having waveforms 2 and 3 according to a preferred embodiment. The lens comprises an optic zone 4 and an outer radial planar zone 5 in which the waveforms 2 and 3 are located. The angle of the waveforms can vary both in relation to each other or relative to the vertical axis of the lens. It will be appreciated that the waveforms may be inserted on the lens in a multiplicity of configurations with the number of waves and the positioning of the waves varying depending upon the particular result desired.

Figure 2:
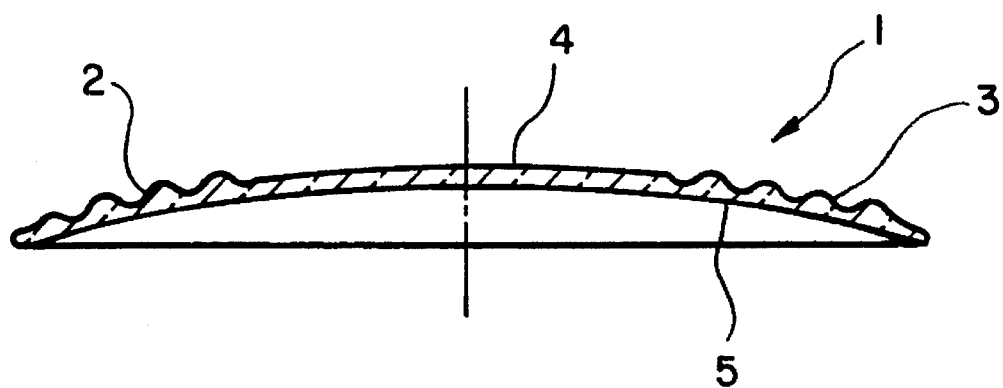
FIG. 2: shows a cross sectional view of the embodiment of FIG. 1.

FIG. 2 shows a cross sectional view of the lens of FIG. 1 wherein the pitch of the waveforms 2 and 3 can be readily seen. The depth of the wave troughs may vary from wave to wave or from lens to lens according to requirements.

Figure 3:
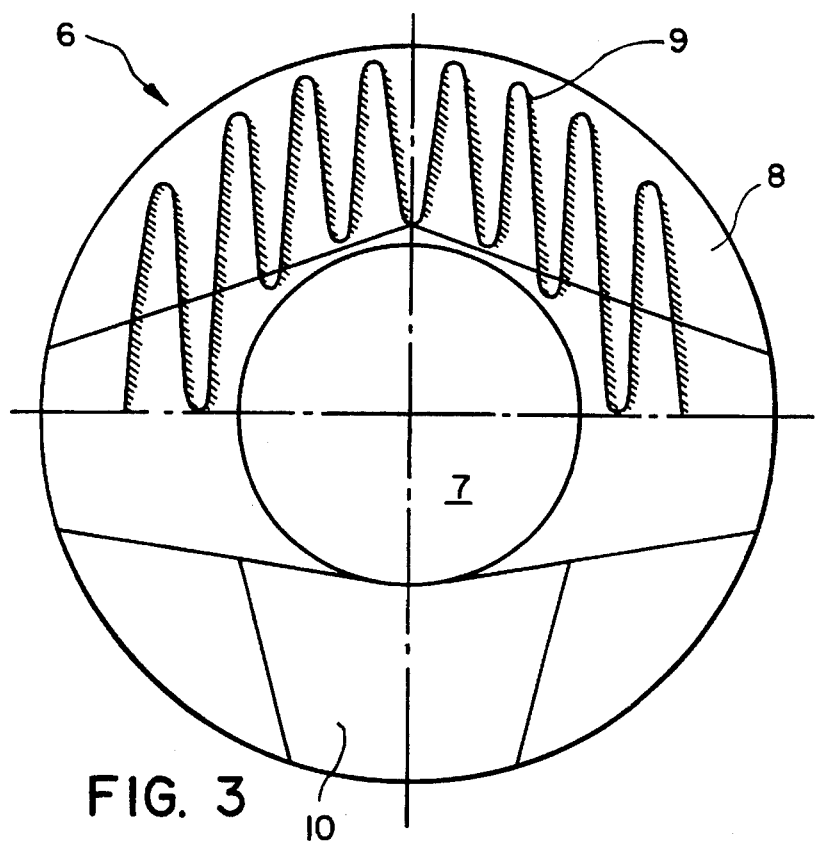
FIG. 3: shows a front elevation of a lens having a waveform thereon according to a preferred embodiment.

Referring to FIG. 3 there is shown an elevational view of a lens 6 having a waveform configuration according to an alternative embodiment. Lens 6 as with lens 1 as previously described, is divided into an optic zone 7 and a radial planar zone 8 in which the waveform 9 is located. The waveform shown travels around the periphery of the first and second quadrants of the lens and is symmetrical about the vertical axis. In an alternative embodiment the lens may also have incorporated in the planar zone thin zones or prism ballast 10 which assists in the locating action caused by the waveforms.

Figure 4:
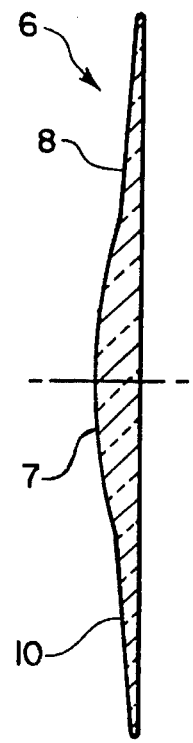
FIG. 4: shows a cross sectional view of the embodiment of FIG. 3.

It will be appreciated that numerous permutations and combinations of waveforms or combinations of waveforms and thin zones or prisms may be incorporated in the lens design. FIG. 4 shows a cross sectional view of the embodiment of FIG. 3.

Figure 5:
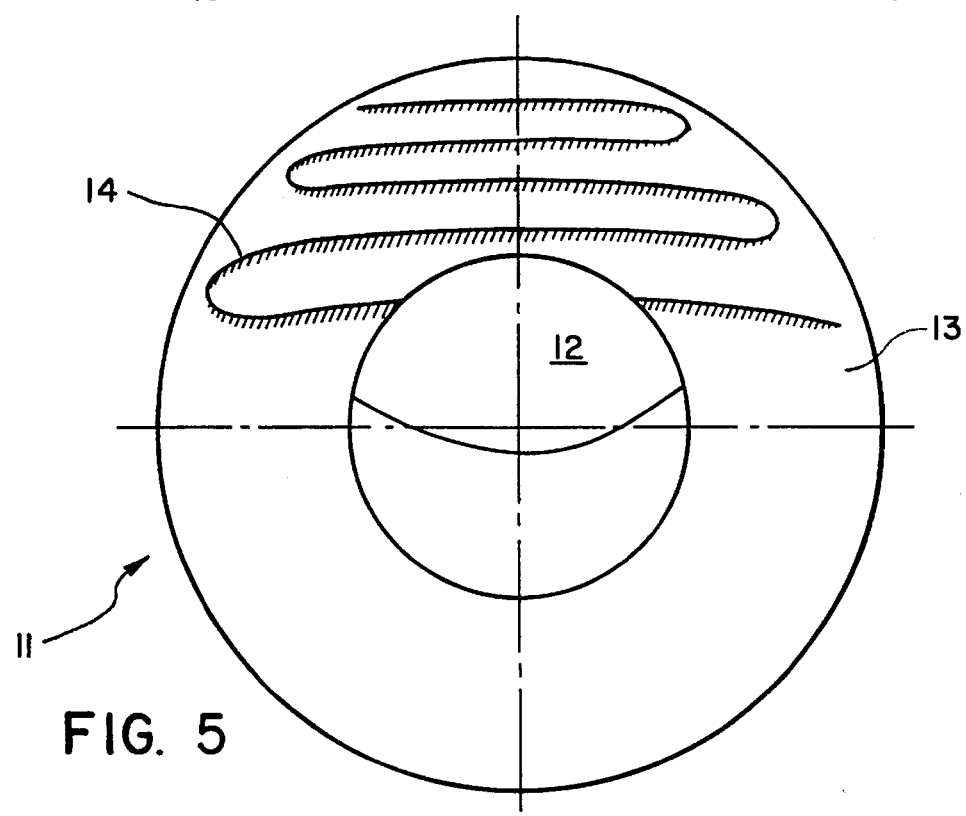
FIG. 5: shows a front elevational view of a lens having a waveform thereon according to a preferred embodiment.

Referring to FIG. 5 there is shown a front elevational view of a lens having a waveform thereon according to an alternative embodiment. Lens 11 comprises an optic zone 12 and a radial planar zone 13 in which waveform 14 is located. Optic zone 12 may be configured as a hi-focal or multi-focal lens.

Waveform 14 is located in quadrants 1 and 2 of the lens 11 and travels generally in the direction of the vertical axis. When a lens is configured with more than one waveform, ideally the waveform is disposed on either side of either the vertical or horizontal axis of the lens such that symmetry is created about one or other of those axes. Where there is a single waveform on the lens which may travel between two quadrants of the lens, this may not necessarily result in symmetry about an axis of the lens.

Although it has hitherto previously been known to utilise patterns and/or grooves in the surface of a lens, it has not previously been revealed exactly how such patterns assist in orientation of the lens on the eye of a wearer.

When the waveform according to the present invention is adopted, the forces which are generated between the waveform and the eye lid of a wearer are transmitted from the tarsal plate via the squeezing action of the obicularis oculi (an onion like muscle which surrounds the orbit and maintains lid tensions on the eye). The eye with lens in vivo will be subjected to both a backward, (that is towards the eye) and a downward force as the lids progress through their blinking phase. The other major force (also mainly downwards), is caused by the levator palpabrae superioris muscle which is attached to the tarsal plate and causes the lids upward and downward motions.

By harnessing both of these forces and the natural rigidity of the tarsal plate, the lens due to the corrugations in or on the surface may be orientated by differential forces applied to the peaks (crests) and the troughs of the waveform.

The crests, due to their relative altitude over the troughs in the waveform will be subjected to a greater backward and downward force than the troughs. This is due to the inherent rigidity of the tarsal plate. The springiness of this bony like structure will therefore transfer forces in a vector downwards and backwards against the peak and sides of the corrugations.

The corrugations themselves would not be so steep or high as to cause the lid not to sweep the total lens. Thus, the forces would be evenly distributed over the surface of the lens by the eye lid of a wearer.

By arranging the corrugations in a particular configuration according to user requirements the inherent forces can, in fact can be channelled downwards, backwards and outwards (towards both nassal and tarsal canthi) and therefore has a stabilising effect.

The ideal conceptual nature of toric stabilisation is to maximise the locating influences on the lens out as wide as possible. This dramatically increases in vivo access stability by placing maximum resistance to rotation at the most advantageous areas of the lens. That is, the highest resistance against rotation is located at the location on the lens where the small force would tend to create unwanted rotation.

Thus, by proper location of the waveforms the leverage effect can be effectively placed. The troughs in the waveform afford the lid an area of lesser resistance (that is, to backward force) in order to vector forces to the sides and tops of the adjacent peaks or crests. Thus the troughs are a crucial part of the stabilising effect without actually having an active part in it in contrast to the crests. The troughs therefore are considered to have a passive roll in allowing a component of the backward forces to be distributed directly onto the crests. Not all of the backward forces exerted by the eye lid will however, be taken by the crests. A component of backward force will be taken by the crests with the size of the component force being dictated by the slope angle of the crests. Although grooves, holes and indentations forming lens surface design patterns are known, even if these were machined and polished smooth they would not have the accurate lens stabilisation and orientation capability imparted by the waveforms as described above.

One of the most significant advantages of the waveform configuration is that ocular scratching and discomfort is eliminated by careful polishing of the surface and in particular the crest surfaces such that the contours are extremely smooth. This form of finish is critical to the prevention of ocular scratching and the elimination of clog up with lipids, mucins and debris. Where grooves, indentations or holes are used according to the prior art, it is possible that lipids, mucins and debris may build up in such grooves and holes thereby creating discomfort for the wearer and other problems associated with deposition.

The present invention provides a particular surface configuration eliminating discontinuities which led to disadvantages in the prior art where patterns were formed on a lens surface.

One disadvantage of the prior art methodology is in the manufacture of the grooves, holes or indentations. Ablation is the only accurate way currently available to mark contact lens material to a predetermined depth. This process causes ionisation of the polymer molecules and leaves a characteristic fish scale appearance of scarred material on the lens surface which is wholly undesirable.

The primary function of this system is again, to harness to natural lid forces to create an external and deliberate physical effect on the lens in question.

It will be recognised by persons skilled in the art that numerous variations and modifications can be made to the overall invention as broadly described herein without departing from the spirit and scope of the invention.

I claim:

1. A contact lens having an optic zone and an outer radial planar zone, the lens comprising an array of contours which are defined by at least one waveform comprising crests and troughs on at least one of the back and front surfaces of the lens, said at least one waveform providing means to enable proper location and orientation of the lens on the eye of a wearer by interaction between said lens, said eye and an eyelid and allowing sufficient gas transmission through said lens.

2. A contact lens according to claim 1 wherein said at least one waveform is formed by means of a raised and lowered area on part or all of the outer radial planar zone of the lens to harness the lens orientation forces.

3. A contact lens according to claim 2 wherein said at least one waveform is configured to maximise resistance of the lens to rotation.

4. A contact lens according to claim 3 wherein said at least one waveform is disposed either randomly or according to a configuration dictated by the requirements of a particular user.

5. A contact lens according to claim 4 wherein said at least one waveform is symmetrical about either the horizontal or vertical axis of the lens.

6. A contact lens according to claim 5 wherein the direction of travel of said at least one waveform is either radial, parallel with or at an angle to either or both the vertical axis and horizontal axis of the lens.

7. A contact lens according to claim 6 wherein the depth of the wave troughs vary from wave to wave.

8. A contact lens according to claim 7 wherein there is one waveform in the planar zone over the first and second quadrants of the lens.

9. A contact lens according to claim 7 wherein a first waveform is disposed in the planar zone between the fourth and first quadrants of the lens and a second wave symmetrical with said first wave about the horizontal axis is disposed in the second and third quadrants of the lens.

10. A contact lens according to claim 7 wherein one waveform is disposed in the direction of the vertical axis and spans the first and second quadrants of the lens.

11. A contact lens according to claim 7 wherein the waveforms are substantially parallel and are formed in series near the edge of the lens.

12. A contact lens according to claim 7 wherein the waveforms are either disposed in a radial array around the periphery of the lens or disposed randomly across at least one of the front surface and back surface of the lens.

13. A contact lens according to claim 1 wherein the planar zone comprises in addition to said at least one waveform, thin zones or prism ballast.

14. A contact lens according to claim 13 wherein the optic zone is mono, bi or multi-focal.

15. A contact lens according to claim 14 wherein the forces generated between the eyelid of a wearer and the lens are, by virtue of said at least one waveform, channelled downwards, backwards and outwards towards both nasal and tarsal canthi thereby effecting stabilisation of the lens.

16. A contact lens according to claim 3 wherein the planar zone comprises in addition to said at least one waveform, thin zones or prism ballast.

17. A contact lens according to claim 2 wherein the planar zone comprises in addition to said at least one waveform, thin zones or prism ballast.

18. A contact lens according to claim 5 wherein the planar zone comprises in addition to said at least one waveform, thin zones or prism ballast.

19. A contact lens according to claim 1 wherein said at least one waveform is on the front convex surface of the lens.

20. A contact lens according to claim 1 wherein said at least one waveform is disposed only in said outer radial planar zone.

21. A contact lens according to claim 1 wherein each waveform has two ends, and the waveform extends between said ends in a wave pattern when viewed from the front surface or back surface of the lens.

22. A contact lens having an optic zone and an outer radial planar zone, the lens comprising at least one waveform, each waveform comprising crests and troughs on at least one of the back and front surfaces of the lens, said at least one waveform providing means to enable location and orientation of the lens on the eye of a wearer by interaction between said lens, said eye and an eyelid and allowing sufficient gas transmission through said lens, each of said waveforms being located only in said outer planar zone and having a plurality of alternating turns between the ends of the waveform.

* * * * *